ACETANILIDO DERIVATIVES AND METHOD FOR PREPARING SAME

Stanley C. Bell and Carl Gochman, Philadelphia, Pa., assignors to American Home Products Corporation, New York, N.Y., a corporation of Delaware
No Drawing. Filed Apr. 19, 1966, Ser. No. 543,555
U.S. Cl. 260—562
Int. Cl. C07c *103/50;* C07d *49/20;* A61k *27/00*
2 Claims This invention relates to new and useful acetanilido derivatives and methods for their preparation.

The compounds deemed to be patentable are those falling within the general formula:

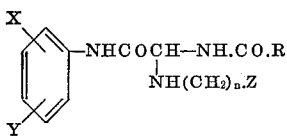

and their acid addition salts, which while useful as chemical intermediates are also useful as possessing certain pharmacological actions as indicated below. In addition, compounds resulting from reactions of these intermediates are also pharmacologically active and may be illustrated by the following structural formula:

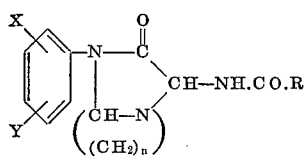

The symbol Z in the first formula represents either a dialkoxyalkyl radical identified as —CH(OR″)$_2$ or an aldehyde radical indicated as —CHO with R″ standing for a lower alkyl.

In regard to the symbols common to both illustrative formulae, X is intended to represent hydrogen, lower alkyl, lower alkoxy, halogen or a halo (lower) alkyl radical, but preferably chlorine. The designation Y is intended to represent the same radicals as X, but additionally an aroyl radical, preferably a benzoyl radical, while R is a lower alkyl and $n$ represents a whole number from 3 to 5.

The above acetanilido or imidazolone compounds have been found to possess useful pharmacological action, demonstrating central nervous system activity, specifically depressant or sedative and anti-convulsant action.

In preparing the compounds described above, the following reaction sequences are carried out which may be somewhat varied as will be indicated below.

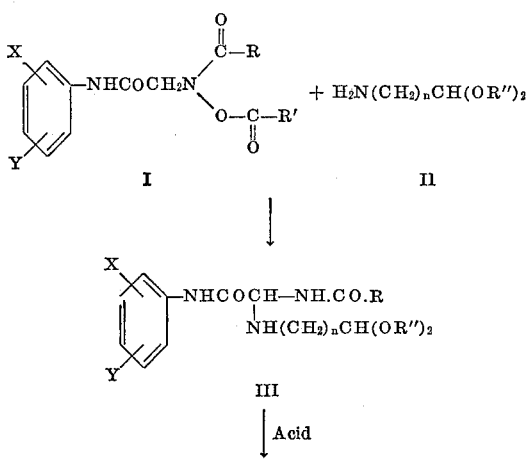

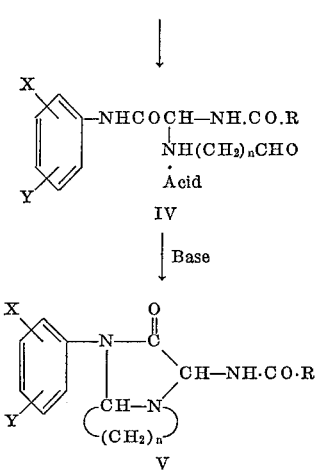

The designation X, Y, R, R″ and $n$ in the reactions outlined are the same as previously given; R′ is intended to represent a lower alkyl and the term "acid" is intended to represent either a non-oxidizing mineral acid, for example, hydrochloride, sulfuric, phosphoric, etc. or an organic acid, for example, tartaric, malonic, maleic, citric, phthalic, salicyclic acids or the like. The term "base" is intended to represent a strongly basic material, preferably an alkali metal hydroxide, for example sodium hydroxide.

In carrying out the process steps as illustrated, a 2-acyloxyacylamino-acetanilide is reacted in a solvent medium, preferably alcoholic, with an amino alkanol acetal at about room temperature. The amino-acetal attaches to the alpha carbon of the acetyl nucleus, replacing the acyloxy radical, thereby forming a 2-acetamido-2-dialkoxyalkylamino acetanilide, shown as the new Compound III.

The new acetanilide so formed is then reacted under acid hydrolysis conditions in a temperature range of about 20° to 50° C., preferably with an acid that will form a non-toxic or pharmaceutically acceptable acid-addition salt of the resultant 2-acetamido-2-oxoalkylamino acetanilide, indicated as Compound IV.

In a final reaction, when one treats the oxoalkylamino acetanilide with a relatively strong base at about room temperature, there is formed, surprisingly, the bicyclic compound, having an imidazole nucleus identified as Compound V.

Compounds of the imidazole type (V) are also capable of forming acid-addition salts and where water-solubility is desired, the desired base may be reacted with hydrogen halide, sulfuric acid or other non-oxidizing mineral acid, or reaction with an organic acid, for example acetic, fumrric, maleic acid or the like will produce the desired acid-addition salt. The acid selected should be one which will form a non-toxic, pharmaceutically acceptable salt.

It has been found that the intermediates formed, shown as structural Formulae III and IV, have pharmacological action qualitatively to the action of the imidazole compounds, and are also useful for experimental purposes in the field of pharmacology.

The products are useful either in typical solid or liquid dosage forms. In the solid form, the active drug is preferably combined with extenders or carriers that are relatively inert, for example lactose or alkaline earth metal carbonates. In the liquid form, when given orally, the drug may be used with a suspending agent, for example, carboxymethylcellulose in water or an oleaginous vehicle. When used parenterally, the drug, in the form of an acid-addition salt is dissolved in an aqueous vehicle.

Pharmacologic action is noted when using the compounds at a dosage level of 1 to 100 mg. per kilogram per day, either in a single or divided doses.

The following examples are given for illustrative purposes only and should not be considered limitative of the inventive scope:

EXAMPLE I 2-acetamido-2'-benzoyl-4'-chloro-2-(4,4-diethoxybutylamino) acetanilide To a suspension of 18.0 g. of 2-[acetoxy(acetyl)amino]-2'-benzoyl-4'-chloroacetanilide in 180 ml. of ethanol was added a solution of 18 g. of γ-aminobutyraldehyde diethylacetal in 60 ml. of ethanol. The reaction was slightly exothermic and formed a clear solution. After stirring of ½ hour, the solution was diluted with 400 ml. of water and chilled. The resultant solid (13.4 g., M.P. 120–122° C.) was collected. Recrystallization from cyclohexane gave an M.P. of 121–123° C.

*Analysis.*—Calc'd for $C_{25}H_{32}ClN_2O_5$: C, 61.27; H, 6.58; N, 8.58; Cl. 7.24. Found: C, 61.25; H, 6.15; N, 8.65; Cl. 7.50.

EXAMPLE II 2-acetamido-2'-benzoyl-4'-chloro-2-(4-oxobutylamino)acetanilide hydrochloride To a suspension of 18 g. of 2-acetamido-2'-benzoyl-4'-chloro-2-(4,4-diethoxybutylamino)acetanilide in 30 ml. of water was added 25 ml. of 1 N hydrochloric acid. The resultant clear solution was stirred for 1½ hours during which time a solid began to precipitate out. The product was collected and recrystallized from methanol and had an M.P. of 134–136° C.

*Analysis.*—Calc'd for $C_{21}N_{22}ClN_3O_4 \cdot HCl$: C, 55.76; H, 5.12; N, 9.29; Cl. 15.68. Found: C, 55.39; H, 5.11; N, 9.48; Cl, 16.0.

EXAMPLE III 3-acetamido-1-(2-benzoyl-4-chlorophenyl)-5,6,7,7a-tetrahydro-1H-pyrrolo[1,2-a]imidazol-2(3H)-one To a solution of 1.7 g. of 2-acetamido-2'-benzoyl-4'-chloro-2-(4-oxobutylamino)acetanilide hydrochloride in water was added 5 ml. of 4 N sodium hydroxide. After a few minutes a solid precipitated out of which was collected (0.7 g. M.P. 185–187° C.) and recrystallized from benzene. The M.P. did not change.

*Analysis.*—Calc'd for $C_{21}H_{20}ClN_3O_3$: C, 63.39; H, 5.07; N, 10.50; Cl, 8.91. Found: C, 63.31; H, 4.95; N, 10.54; Cl, 9.10.

If one wishes to simplify the above process steps and where the interest is primarily in the imidazole final product. The intermediate produced according to Example I may be treated first with acid and then with alkali hydroxide as shown in the following example.

EXAMPLE IV

To a mixture of 9.8 g. of 2-acetamido-2'-benzoyl-4'-chloro-2-(4,4-diethoxybutylamino)acetanilide and 100 ml. of water was added a solution of 30 ml. of 2 N hydrochloric acid and the resultant solution was warmed at 40° C. for 15 minutes. The solution was cooled and to it was added 50 ml. of benzene. With stirring there was added 40 ml. of 2 N sodium hydroxide solution. After 1 hr. the precipitate was collected. There was obtained 6.3 of product, M.P. 185–187° C., which was the same as produced by Example III.

In the same manner as described above, one may similarly prepare a 3-acylamido-3,5,6,7,8,8a-hexahydropyrido-(1,2-a) imidazol-2(1H)-one or a 3-acylamido-5,6,7,8,9,9a-hexahydro-1H-azepino(1,2-a)imidazol-2(3H) - one, by starting with an omegaaminovaleraldehyde or caproaldehyde-di(lower)alkylacetal.

What we claim is:

1. The new compound, 2 - acetamido - 2'-benzoyl-4'-chloro-2-(4,4-diethoxybutylamino)acetanilide.

2. The new compound, 2 - acetamido - 2'-benzoyl-4'-chloro-2-(4-oxobutylamino)acetanilide hydrochloride.

References Cited

UNITED STATES PATENTS 3,344,136   9/1967   Bell et al. _____ 260—562 X

OTHER REFERENCES

Bell et al., Tetrahedron Letters, vol. 33, pp. 2889–91 (1965).

HENRY R. JILES, *Primary Examiner.*

HARRY I. MOATZ, *Assistant Examiner.*

U.S. Cl. X.R.

260—309.7, 294; 424—324.